Patented Aug. 28, 1945

2,383,816

UNITED STATES PATENT OFFICE 2,383,816

ALKALI COMPOUNDS CONTAINING ANTIOXIDANT COMPOSITIONS

Roy W. Riemenschneider, Glenside, and Jack Turer, Philadelphia, Pa., assignors to Claude R. Wickard, as Secretary of Agriculture of the United States of America, and his successors in office No Drawing. Application April 24, 1943, Serial No. 484,348

12 Claims. (Cl. 260—398.5)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to antioxidant compositions and more particularly to rancidity inhibitors for oleaginous materials of the glyceride type and other esters of fat acids.

In the refining of vegetable oils it is common practice to use alkaline reagents such as sodium hydroxide or sodium carbonate. Also, alkali carbonates and bicarbonates are requently employed in refining fatty materials of animal origin. This treatment of fats and oils with alkaline substances reduces their keeping quality, probably by destroying or eliminating some of the natural antioxidants present in fatty substances. In addition, alkali-refined fats and oils always contain small amounts of the alkaline compounds used, the complete removal of these substances not being possible by the usual methods. The presence of these alkaline compounds, such as soaps, or even mildly alkaline bicarbonates, has a pronounced detrimental effect upon the stability of the fats. Furthermore, their presence adversely affects the antioxidant activity of such rancidity inhibitors as alpha-tocopherol or phospholipids.

Wells and Riemenschneider have shown in their application for patent, Serial No. 472,280, filed January 13, 1943, that ascorbyl monoesters of fat acids are fat-soluble substances having excellent rancidity-inhibiting properties.

We have found that the deleterious effect of alkali compounds on the stability of fatty materials is precluded in the presence of ascorbyl monoesters of fat esters. We have also found that the antioxidant properties of these esters are enhanced in the presence of small amounts of alkali compounds.

The term "ascorbyl monoesters of fat acids," as used herein, is defined as the monoesters of saturated aliphatic monocarboxylic acids containing from 12 to 18 carbon atoms per molecule with compounds of the ascorbic acid series having the general formula:

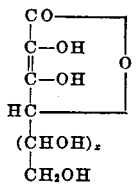

where $x$ is 0 or a whole number not exceeding 3. Thus, the term "ascorbyl monoester of fat acids" is meant to include such compounds as myristyl, lauryl, palmityl, stearyl monoesters of d- and l-ascorbic acid, d- and l-isoascorbic acid, or of other compounds of the ascorbic acid series, used either singly or in combination.

Ascorbyl monoesters of fat acids may be obtained by the interaction of the carboxylic acids with compounds of the ascorbic acid series in the presence of concentrated sulfuric acid, as described by Wells and Swern in their applications for patent, Serial No. 442,557, filed May 11, 1942, and Serial No. 442,558, filed May 11, 1942. According to the methods disclosed in these applications, the monocarboxylic acid and the compound of the ascorbic acid series are dissolved in concentrated sulfuric acid and the mixture is maintained at a suitable temperature, preferably at ordinary room temperature, for a length of time necessary to effect esterification, which usually requires 16 to 20 hours. The monoester is then isolated from the sulfuric acid solution by any suitable procedure; for instance, by dilution with water followed by solvent extraction.

The method of preparing these monoesters is further illustrated by the following examples:

Example I l-Ascorbyl palmitate, the palmitic acid monoester of l-ascorbic acid, is prepared by dissolving 8.8 grams of l-ascorbic acid and 10.3 grams of palmitic acid in 100 cc. of 95 percent sulfuric acid at essentially room temperature. The solution is allowed to sand for about 16 hours after which the reaction mixture is poured slowly and with vigorous stirring into about 500 grams of chopped ice. The stirring is continued until the oily phase of the mixture has solidified. The mixture is then extracted with ethyl ether and the ether extract is washed with water until the washings are subsantially free of mineral acid. The ether extract is then dried and evaporated to dryness and the residue remaining is powdered and washed by decantation with 200 to 300 cc. of petroleum ether (boiling range 35° to 60° C.), thereby removing unreacted palmitic acid from the reaction product. The white solid residue is insoluble in petroleum ether and consists essentially of ascorbyl monopalmitate. The yield is good.

Example II 8.8 grams of d-isoascorbic acid are esterified with 10.3 grams of palmitic acid in 100 cc. of 95 percent sulfuric acid by the procedure described in Example I. The reaction product after removal of unreacted palmitic acid consists essentially of d-isoascorbyl monopalmitate. The yield is good.

While our invention is not limited to any particular hypothesis as to the cause of the increased antioxidant activity of the esters in presence of alkali compounds, it is believed plausible that at least a portion of the ester is converted to an alkali salt. The probable structure of such alkali salts may be illustrated by the following formulas which are believed to represent the configuration of the sodium salt of a monoester of ascorbic acid:

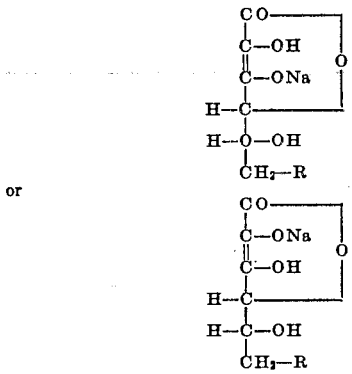

where R represents the acyl radical.

Formation of the alkali salts is illustrated by the following examples:

Example III 10.4 grams of l-ascorbyl palmitate was dissolved in 200 cc. of ethanol, and 1 gram of sodium hydroxide dissolved in 10 cc. of water was then added slowly and with stirring to the alcohol solution of the ascorbyl palmitate. The reaction proceeded readily even at room temperatures. White solid material separated from the cool reaction mixture and was easily removed by suction filtration. This solid was washed twice with cold ethanol and dried at room temperature. The yield was very good. This material turned brown on heating to temperatures above 100° C. but had no definite melting point. Carbon analysis: 63.6 percent. The theoretical percent of carbon in the monosodium salt of l-ascorbyl palmitate is 63.7 percent.

The formation of the monosodium salt of l-ascorbyl palmitate takes place quantitatively due to the acidic hydrogen atom of the enediol group. In fact, the ester can be titrated quantitatively with standard alkali in alcohol solution with phenolphthalein as indicator. The molecular weight of the ester can thus be determined accurately by this means.

Example IV 10.4 grams of d-isoascorbyl palmitate was dissolved in 150 cc. of ethanol, 1 gram of sodium hydroxide dissolved in 20 cc. of water was added, and the preparation was carried out as described in Example III. The yield was very good. Carbon: Found, 63.5 percent; theoretical, 63.7 percent.

d-Isoascorbyl palmitate can likewise be titrated quantitatively in alcohol solution with standard alkali as in Example III.

By titration of the sodium salt of l-ascorbyl palmitate and also the sodium salt of d-isoascorbyl palmitate in acidified alcohol solution with standard iodine solution, the preparations were found to be greater than 99 percent pure. In this reaction the iodine reacts with the enediol group in the same manner as it does with l-ascorbic acid.

In copending applications for patent, Serial No. 479,686, filed March 19, 1943; Serial No. 484,346, filed April 24, 1943; and Serial No. 484,347, filed April 24, 1943, we have shown the synergistic antioxidant effect obtained by the use of rancidity-inhibiting compositions comprising ascorbyl monoesters of fat acids in conjunction with alpha-tocopherol or its isomers and analogues and/or phospholipids. This synergistic antioxidant effect also takes place in the presence of alkali compounds, as may be seen from the following tabulation of experimental data which illustrates our invention:

| Substrate | Substances added to the substrate | | | | | | Stability |
|---|---|---|---|---|---|---|---|
| | Ascorbyl monoester used | Amount of ester | Sodium stearate | Sodium bicarbonate | Soybean phospholipids | Alpha-tocopherol | |
| | | Per cent | Per cent | Per cent | Per cent | Per cent | Hours |
| Prime steam lard A | | | | | | | 2½ |
| Do | | | 0.01 | 0.001 | | | 1¾ |
| Do | d-Isoascorbylpalmitate | 0.12 | | | | | 2½ |
| Do | do | 0.12 | 0.01 | 0.001 | | | 3¾ |
| Do | | | | | 0.03 | | 5½ |
| Do | do | 0.12 | 0.01 | 0.001 | 0.03 | | 17¾ |
| Do | do | 0.24 | 0.01 | 0.001 | | | 6¼ |
| Do | do | 0.24 | 0.01 | 0.001 | 0.03 | | 73 |
| Do | do | 0.47 | | | | | 2¼ |
| Do | | | 0.03 | 0.005 | | | 1¼ |
| Do | | | 0.03 | 0.005 | 0.03 | | 2¼ |
| Do | do | 0.47 | 0.03 | 0.005 | 0.03 | | Over 56 |
| Do | | | | | | 0.001 | 4 |
| Do | | | 0.03 | 0.005 | | 0.001 | 1¼ |
| Do | | | | | 0.03 | 0.001 | 8 |
| Do | do | 0.47 | | | | 0.001 | 3 |
| Do | do | 0.47 | 0.03 | 0.005 | 0.03 | 0.001 | Over 56 |
| Do | do | 0.24 | | | | | 1¼ |
| Do | do | 0.25 Na-salt | | | | | 4¾ |
| Prime steam lard B | | | | | | | 4 |
| Do | do | 0.06 | | | | | 3 |
| Do | do | 0.04 [1] 0.02 | | | | | 4¼ |
| Do | do | 0.04 [1] 0.02 | | | | 0.03 | 20 |
| Do | | | | | | 0.03 | 0.001 | 4½ |
| Do | do | 0.04 [1] 0.02 | | | | 0.03 | 0.001 | 31¼ |

[1] Sodium salt of ester.

In the foregoing tabulation of experimental results the stability of the tested materials indicates the length of time required to attain a peroxide content equal to 20 milli-equivalents per kilogram of the fatty substrate. The stability is determined by the Swift stability test, also known as the active oxygen method, in which air is bubbled at a uniform and predetermined rate through samples of fatty material maintained at 100° C. At regular intervals the samples are tested for peroxide content by determining the amount of free iodine liberated from potassium iodide by the peroxide-like oxidation products formed in the fatty material.

This invention is not limited, however, to the specific embodiments listed in the foregoing table, but is applicable to any oleaginous material of the glyceride type or other esters of fat acids. Sodium stearate may be replaced by other alkali soaps and sodium bicarbonate by other alkali carbonates or bicarbonates, for instance, potassium bicarbonate.

Having thus described our invention, we claim:

1. An antioxidant composition comprising an ascorbyl monoester of a saturated aliphatic monocarboxylic acid containing from 12 to 18 carbon atoms per molecule, an alkali soap and a compound selected from the group consisting of alkali carbonates and alkali bicarbonates.

2. An antioxidant composition comprising d-isoascorbyl monopalmitate, sodium stearate and sodium bicarbonate.

3. An antioxidant composition comprising d-isoascorbyl monopalmitate, soybean phospholipids, sodium stearate and sodium bicarbonate.

4. An antioxidant composition comprising d-isoascorbyl monopalmitate, soybean phospholipids, alpha-tocopherol, sodium stearate and sodium bicarbonate.

5. An antioxidant composition comprising an ascorbyl monoester of a saturated aliphatic monocarboxylic acid containing from 12 to 18 carbon atoms per molecule and an alkali salt of said ascorbyl monoester.

6. An antioxidant composition comprising d-isoascorbyl monopalmitate and the sodium salt of d-isoascorbyl monopalmitate.

7. An antioxidant composition comprising d-isoascorbyl monopalmitate, soybean phospholipids, and the sodium salt of d-isoascorbyl monopalmitate.

8. An antioxidant composition comprising d-isoascorbyl monopalmitate, soybean phospholipids, alpha-tocopherol, and the sodium salt of d-isoascorbyl monopalmitate.

9. The method of inhibiting animal and vegetable fats and oils and other esters of fat acids against oxidative rancidity, which comprises incorporating therewith an antioxidant composition comprising an ascorbyl monoester of a saturated aliphatic monocarboxylic acid containing 12 to 18 carbon atoms per molecule, an alkali soap and a compound from the group consisting of alkali carbonates and alkali bicarbonates.

10. The method of inhibiting animal and vegetable fats and oils and other esters of fat acids against oxidative rancidity, which comprises incorporating therewith an antioxidant composition comprising an ascorbyl monoester of a saturated aliphatic monocarboxylic acid containing 12 to 18 carbon atoms per molecule and an alkali salt of said ascorbyl monoester.

11. An oleaginous composition comprising esters of fat acids, having incorporated therein in amounts sufficient to inhibit the development of oxidative rancidity an ascorbyl monoester of a saturated aliphatic monocarboxylic acid containing 12 to 18 carbon atoms per molecule, an alkali soap and a compound selected from the group consisting of alkali carbonates and alkali bicarbonates.

12. An oleaginous composition comprising esters of fat acids, having incorporated therein in amounts sufficient to inhibit the development of oxidative rancidity an ascorbyl monoester of a saturated aliphatic monocarboxylic acid containing 12 to 18 carbon atoms per molecule and an alkali salt of said ascorbyl monoester.

ROY W. RIEMENSCHNEIDER.
JACK TURER.